US010876672B2

(12) United States Patent
Quesada (10) Patent No.: US 10,876,672 B2
(45) Date of Patent: Dec. 29, 2020

(54) SEALING JOINT FOR LOW PRESSURE PIPE SYSTEMS AND METHOD OF MANUFACTURE

(71) Applicant: S & B Technical Products, Inc., Fort Worth, TX (US)

(72) Inventor: Guido Quesada, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 195 days.

(21) Appl. No.: 15/904,711

(22) Filed: Feb. 26, 2018

(65) Prior Publication Data

US 2018/0245727 A1    Aug. 30, 2018

Related U.S. Application Data

(60) Provisional application No. 62/463,029, filed on Feb. 24, 2017.

(51) Int. Cl.

| | |
|---|---|
| *F16L 55/178* | (2006.01) |
| *F16L 13/02* | (2006.01) |
| *E03F 3/04* | (2006.01) |
| *F16L 21/00* | (2006.01) |
| *F16L 17/025* | (2006.01) |
| *F16J 15/08* | (2006.01) |
| *E03C 1/122* | (2006.01) |
| *F16L 17/035* | (2006.01) |
| *F16L 21/03* | (2006.01) |

(Continued)

(52) U.S. Cl.
CPC ............ *F16L 55/178* (2013.01); *E03C 1/122* (2013.01); *E03F 3/04* (2013.01); *F16J 15/0818* (2013.01); *F16L 13/0236* (2013.01); *F16L 17/025* (2013.01); *F16L 17/035* (2013.01); *F16L 21/005* (2013.01); *F16L 21/03* (2013.01); *B29C 2045/14959* (2013.01); *F16J 2015/0875* (2013.01); *F16L 21/035* (2013.01)

(58) Field of Classification Search
CPC ... F16L 55/178; F16L 13/0236; F16L 17/025; F16L 17/035; F16L 21/005; F16L 21/03; F16L 21/035; E03C 1/122; E03F 3/04; F16J 15/0818; F16J 2015/0875
See application file for complete search history.

(56) References Cited

U.S. PATENT DOCUMENTS

| | | | | |
|---|---|---|---|---|
| 4,818,209 | A | * | 4/1989 | Petersson ............ F16L 37/0845 425/392 |
| 4,834,398 | A | * | 5/1989 | Guzowski ............. F16L 17/035 277/624 |

(Continued)

*Primary Examiner* — Eugene G Byrd
(74) *Attorney, Agent, or Firm* — Whitaker Chalk Swindle & Schwartz PLLC; Charles Gunter (57) ABSTRACT

A method and sealing gasket are shown for providing a sealing joint between a spigot section and a socket section of low pressure plastic pipe, such as drain waste vent pipe that require a minimum of tools and operational steps to complete. The sealing gasket is installed in one of the sections to be joined and the spigot section is inserted within a mouth opening of the socket section with the sections being pressed together in a single operation, thereby forming both the joint and the seal. The sealing gasket is a composite gasket made with one section of a hard plastic material and one section of a thermoplastic elastomer material. No glue or adhesive is required.

5 Claims, 10 Drawing Sheets

(51) Int. Cl.
   *F16L 21/035* (2006.01)
   *B29C 45/14* (2006.01)

(56) References Cited

U.S. PATENT DOCUMENTS

| | | | | |
|---|---|---|---|---|
| 5,213,339 | A * | 5/1993 | Walworth | F16L 21/03 |
| | | | | 277/314 |
| 6,277,315 | B1 * | 8/2001 | Hållstedt et al. | F16J 15/104 |
| | | | | 264/250 |
| 6,299,176 | B1 | 10/2001 | Guzowski et al. | |
| 6,367,802 | B1 * | 4/2002 | Knapp | F16L 21/03 |
| | | | | 277/314 |
| 7,252,293 | B2 | 8/2007 | Happel | |
| 7,731,884 | B2 | 6/2010 | Knapp et al. | |
| 8,096,585 | B2 * | 1/2012 | Vitel | F16L 17/035 |
| | | | | 285/110 |
| 8,622,399 | B2 | 1/2014 | Monteil | |
| 9,593,787 | B2 | 3/2017 | Monteil et al. | |
| 2004/0108714 | A1 * | 6/2004 | Houghton | F16L 21/03 |
| | | | | 285/110 |
| 2010/0078937 | A1 * | 4/2010 | Jones | F16L 21/03 |
| | | | | 285/345 |
| 2014/0374994 | A1 * | 12/2014 | Monteil | F16L 17/035 |
| | | | | 277/314 |
| 2014/0374995 | A1 * | 12/2014 | Monteil | F16J 15/104 |
| | | | | 277/314 |
| 2015/0152990 | A1 * | 6/2015 | Lopez-Chaves | F16J 15/104 |
| | | | | 277/609 |
| 2016/0223109 | A1 * | 8/2016 | Lopez-Chaves | F16J 15/022 |

* cited by examiner

| Size | OD | | Φa | | Φb | | Φc | | Φd | | C | | D | | E | | Ra | Rb |
|---|---|---|---|---|---|---|---|---|---|---|---|---|---|---|---|---|---|---|
| DN | Nom | Tol | Nom | Tol | Nom | Tol | Nom | Tol | Nom | Tol | Nom | Tol | Nom | Tol | Nom | Tol | Nom | Nom |
| 4 | 114.3 | -0.2 0.2 | 115.7 | 0.0 0.6 | 132.7 | 0.0 0.6 | 115.3 | 0.0 0.3 | 114.5 | 0.0 0.3 | 12.7 | -0.3 0.3 | 20.8 | -0.3 0.3 | 28.6 | -0.5 0.5 | 2.4 | 3.0 |
| 6 | 168.3 | -0.3 0.3 | 169.8 | 0.0 0.6 | 183.1 | 0.0 0.6 | 169.3 | 0.0 0.3 | 168.6 | 0.0 0.3 | 18.3 | -0.3 0.3 | 20.8 | -0.3 0.3 | 50.6 | -0.5 0.5 | 2.4 | 3.0 |
| 8 | 219.1 | -0.4 0.4 | 220.9 | 0.0 0.6 | 235.5 | 0.0 0.6 | 220.2 | 0.0 0.3 | 219.5 | 0.0 0.3 | 21.6 | -0.3 0.3 | 20.8 | -0.3 0.3 | 62.5 | -0.5 0.5 | 2.4 | 3.0 |

FIG. 7

| SIZE | | OD | | HEIGHT T | | WIDTH W | |
|---|---|---|---|---|---|---|---|
| DN | VERSION | NOMINAL | TOL | NOMINAL | TOL | NOMINAL | TOL |
| 4 | C02 | 134.4 | -0.8 0.8 | 13.2 | -0.3 0.3 | 19.8 | -0.5 0.5 |
| 6 | C02 | 185.4 | -0.9 0.9 | 10.6 | -0.3 0.3 | 19.8 | -0.5 0.5 |
| 8 | C02 | 238.4 | -1.2 1.2 | 11.7 | -0.3 0.3 | 19.8 | -0.5 0.5 |

SEALING JOINT FOR LOW PRESSURE PIPE SYSTEMS AND METHOD OF MANUFACTURE

CROSS REFERENCE TO RELATED APPLICATIONS

The present application claims priority from a previously filed provisional application, Ser. No. 62/463,029, filed Feb. 24, 2017, entitled "Sealing Joint For Low Pressure Pipe Systems and Method of Manufacture", by the same inventor.

BACKGROUND OF THE INVENTION

2. Field of the Invention

The present invention generally relates to sealing structures and methods for low pressure pipe sealing applications and, more specifically, for such seal structures particularly adapted for use in pipe joints formed using drain waste vent pipe and sewer pipe.

3. Background of the Invention and Description of the Prior Art

A number of low pressure plastic pipe systems are in commercial use at the present time. Common examples include sewer pipe and Drain Waste Vent pipe. Drain Waste Vent (DWV) pipe is typically used to convey waste water from residential and commercial buildings via sewer and grey water lines. In such applications, the flow is generally enabled by gravity under relatively low pressures. DWV pipe will be used in the discussion which follows as one preferred example of the use of the sealing structure of the invention. However, the invention should not be interpreted as being solely limited to DWV pipe systems.

Conventional methods for joining the proximate ends of drain waste vent pipes include the use of glues, adhesives, and solvents to glue or chemically weld components together. PVC, CPVC and ABS plastic plumbing tubing and fittings are typically coupled by solvent welding. It is known to use heat to melt and weld together plastic tubing and fittings formed from polyethylene or polypropylene mechanical couplings that use compression fittings, toothed collets, interlocking ribs and recesses, electrical-resistance welding, and the like are also known.

Experienced installers typically utilize plumbing pipes and fittings adapted for solvent welding as the pipes and fittings are generally less expensive. In addition, when installed properly, the solvent weld systems generally tend to be less prone to leak. However, solvent weld systems are sometimes more difficult to install for inexperienced installers and installation conditions may make the use of mechanical couplings preferable.

The fittings employed for each of these joining methods are specific to the particular joining method being employed. This requires that manufacturers, wholesalers, and retailers stock separate fittings for each joining method. This requires additional storage space and inventory to be maintained, as installers must have the correct fitting for each particular joining method that they might use on the job site. This can be a difficult task when an installer is unaware of the particular conditions they might encounter during an installation.

The use of chemical solvents or cements can cause various complications because of potential toxicity of the chemicals. As an example, an installer might plan to use only glue fittings for a given installation. The installer might then encounter an instance in which the use of glue fittings creates a safety risk, such as in a confined space where ventilation of the glue vapors is not sufficient to prevent inhalation by the installer or combustion of the vapors by contact with a flame or other ignition source is a possibility. In such a situation, the installer must cease work until additional fittings are configured that do not require the use of chemical solvents of glues. Additionally, the prior art procedures often required several steps or operations, and often certain regulated safety precautions came into play that took time to complete.

It would be advantageous if many of the prior art procedures could be simplified or eliminated. It would be particularly advantageous if a DWV or sewer pipe joint could be provided without the necessity of using chemical solvents or cements.

SUMMARY OF THE INVENTION

Accordingly there is provided a sealed joint for mating sections of low pressure pipe, such as sealed joints of drain waste vent (DWV) pipe or sewer pipe. An assembled pipe joint according to the invention has a first section of low pressure pipe having a spigot formed in a first end thereof. A second section of low pressure pipe has a socket also formed in a first end thereof. A sealing gasket is used to form a sealed joint between the first and second sections of low pressure pipe. The spigot of the first section of low pressure pipe is received within the socket of the second section of low pressure pipe with the sealing gasket is disposed there between within a circumferential rectangular raceway formed at an interface of the spigot and socket. The sealing gasket which is used to seal the joint is a composite gasket formed with a relatively hard plastic portion of the gasket bonded to an engineered plastic portion of the gasket, referred to herein as a "thermoplastic elastomer material" or TPE for short.

Preferably, the circumferential raceway which receives the gasket is formed in a surface of the socket of the first section of low pressure pipe and may have a generally rectangular cross-sectional profile. The most preferred gasket is a PP/TPE bonded gasket. The sealing gasket is formed with a leading nose region which is joined to an outwardly extending lip region which seals against the socket raceway. The outwardly extending lip region is joined by a V-shaped region to an inwardly extending lip region which seals against the spigot when the pipe joint is made up. The inwardly extending lip region is joined to the leading nose region by a sloping surface of the gasket. Preferably, the PP portion of the gasket is joined to the TPE portion of the gasket by at least a pair of interface surfaces which form angles on the order of 90° with respect to the adjacent exterior surfaces of the gasket.

The outwardly extending lip region is typically of greater relative length than the inwardly extending lip region, whereby a space is created between an outer region of the sealing gasket and an edge of the raceway when the pipe joint is made up to prevent fishmouthing during joint make up. The nose region of the sealing gasket can be made either relatively longer or shorter to adjust to a relatively narrow or wide raceway.

In a method of manufacturing a sealing gasket of the invention, the hard plastic part of the gasket is first injection molded in a first mold. This part is then taken out of the first mold and placed into a second mold where the softer rubber-like material is injected. The gasket is then cured and removed from the second mold.

A method is also shown for forming a sealed joint between first and second sections of low pressure pipe which includes the steps of:

installing a composite sealing gasket of the type described above within a raceway provided in a socket end of a first section of the low pressure pipe;

providing a second mating section of low pressure pipe having a spigot end;

inserting the mating spigot pipe end into the socket pipe end for a prescribed distance, thereby forming the sealed joint; and wherein the first section of the gasket is formed of a hard plastic material and the second section of the gasket is formed of a relatively softer and more flexible thermoplastic elastomer material.

The first and second sections of low pressure pipe are pushed together until a stop within the socket pipe end is contacted by the spigot pipe end.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

The sealing gasket of the invention is used to make up a sealed joint between mating sections of low pressure pipe, such as Drain Waste Vent (DWV) pipe or sewer pipe and has properties specifically designed for that application. The primary application will be described with reference to a DWV pipe. As has been briefly discussed, DWV pipe is typically used to convey waste water from residential and commercial buildings via sewer and grey water lines. In such applications, the flow is generally enabled by gravity under relatively low pressures. The gaskets of the invention are pressure tested to at least 50 psi (345 kPa) and sometimes beyond. They have special applicability in DWV fittings where the socket end of the pipe is provided with an internal rectangular raceway or groove, such as the generally rectangular groove shown as 17 in FIG. 1A.

The invention will be described with respect to a DWV pipe system as one preferred embodiment of the invention. However, the improved sealing system of the invention in not intended to be limited to DWV pipe systems but may find application in other low pressure pipe systems such as, for example, sewer pipe systems. The pipe systems are not limited to PVC, CPVC or ABS pipe, but may also find application in PP or PE pipe systems.

As discussed, conventional methods for joining the proximate ends of drain waste vent pipes include the use of glues, adhesives, and solvents to glue or chemically weld components together. PVC, CPVC and ABS plastic plumbing tubing and fittings are typically coupled by solvent welding. The use of glues and adhesives creates problems in the area of environmental friendliness and can even pose health hazards in the work environment at times.

It is also known to use heat to melt and weld together plastic tubing and fittings formed from polyethylene or polypropylene mechanical couplings that use compression fittings, toothed collets, interlocking ribs and recesses, electrical-resistance welding, and the like are also known. These types of joining systems tend to be overly complicated and sometimes expensive.

Figure 3:
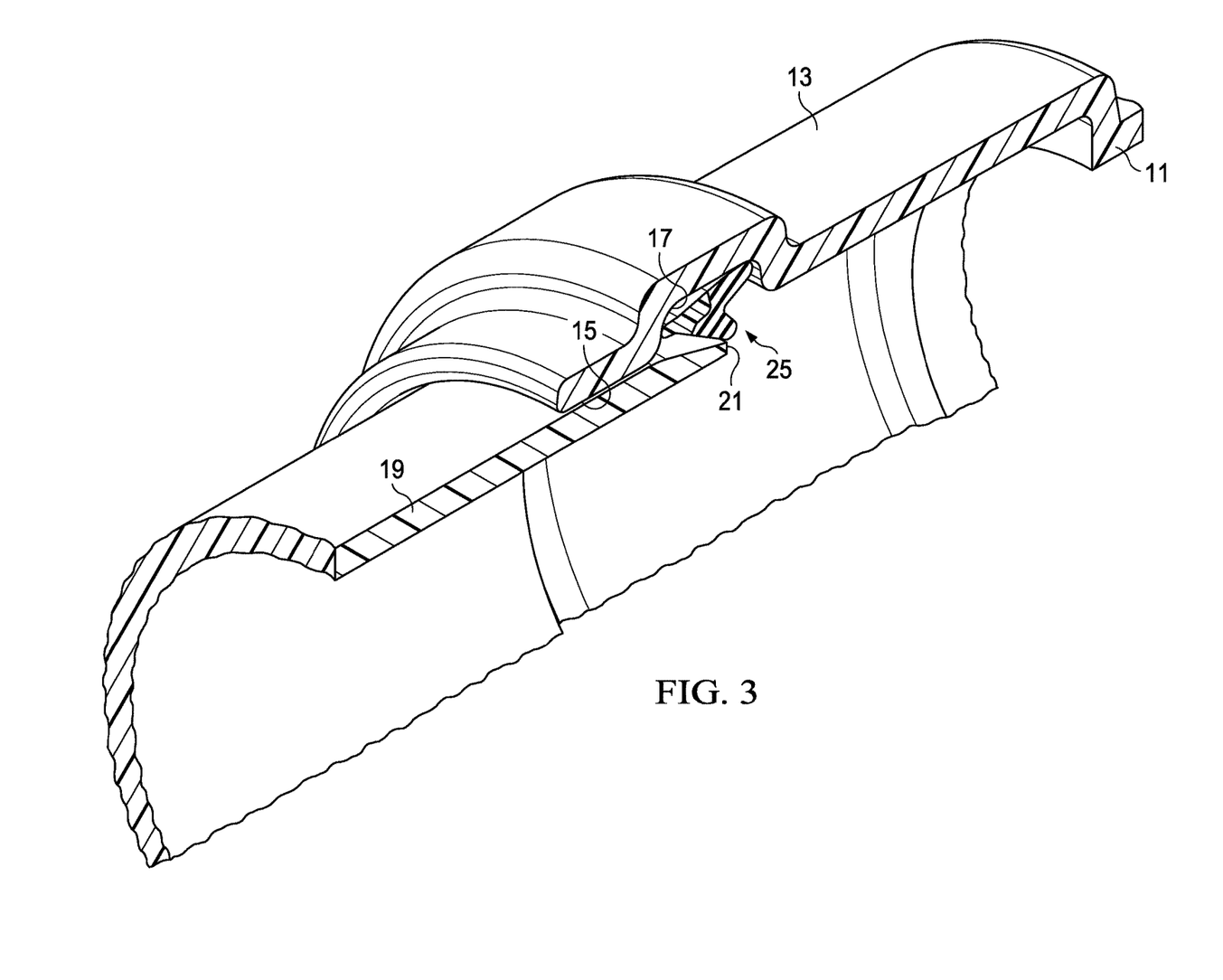
FIG. 3 is partial sectional view showing the beginning assembly of a spigot end of a section of DWV pipe within the mating socket end of pipe in making up a sealing joint of the invention.
Figure 4:
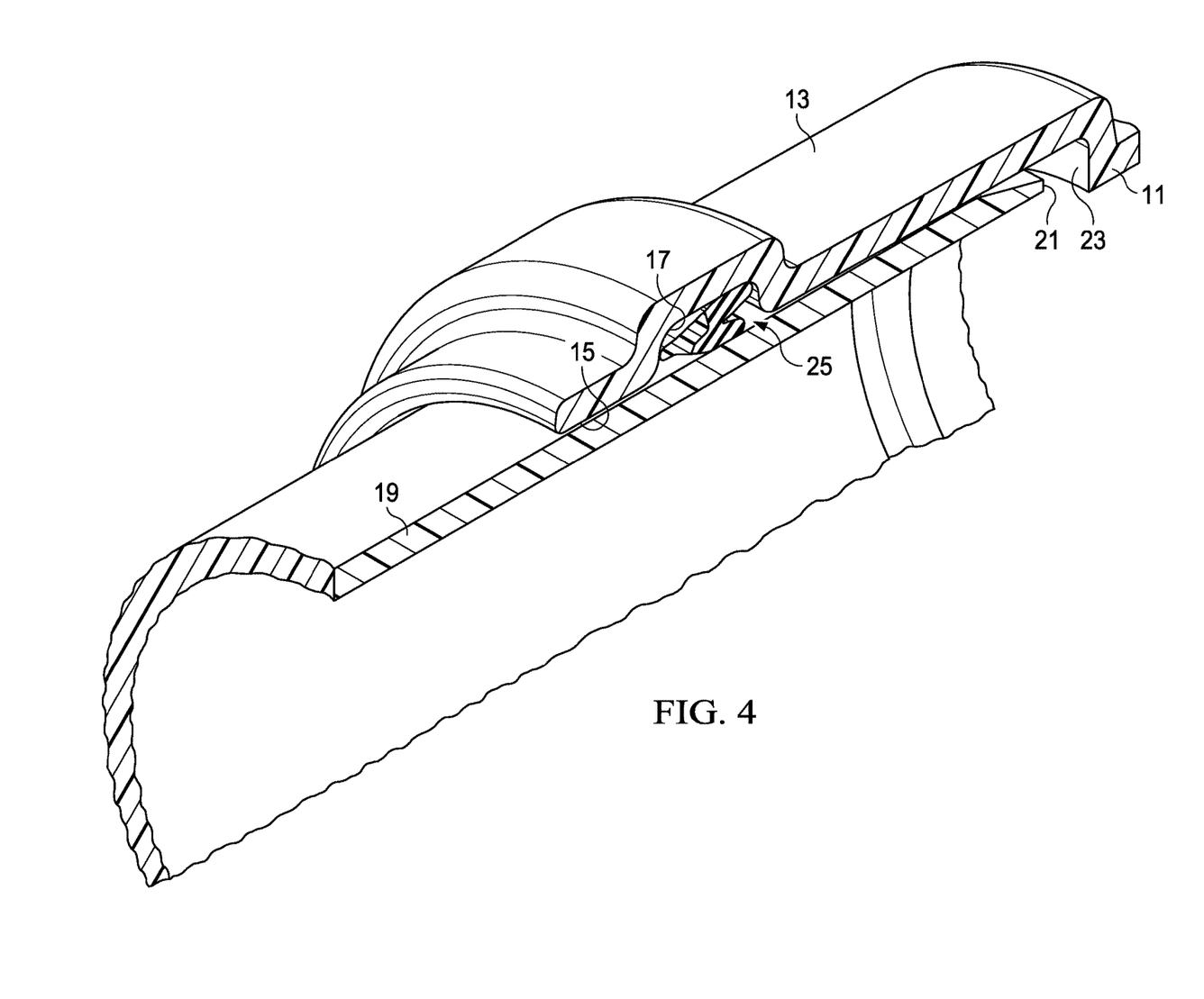
FIG. 4 is a view similar to FIG. 3, but showing the continued assembly of the spigot pipe end within the mating socket pipe end of DWV pipe.

FIG. 3 is a partial sectional view of a pipe joint using the sealing structure of the invention. A first section of DWV pipe 11 has a socket end 13 with a mouth opening 15. Adjacent the mouth opening 15 is an internal raceway or groove 17. In this respect, the raceway of the DWV joint differs from the typical socket groove used in PVC water and sewer lines where the internal groove tends to be more V-shaped or with angular sloping sidewalls. The socket pipe end 13 in FIG. 3 is shown initially engaging a mating spigot pipe end 19. As shown in FIG. 4, the spigot pipe end 19 is inserted into the mouth opening 15 of the socket pipe end until the spigot tip 21 contacts an end wall or stop 23 formed in the interior of the socket pipe end 13.

Figure 7:
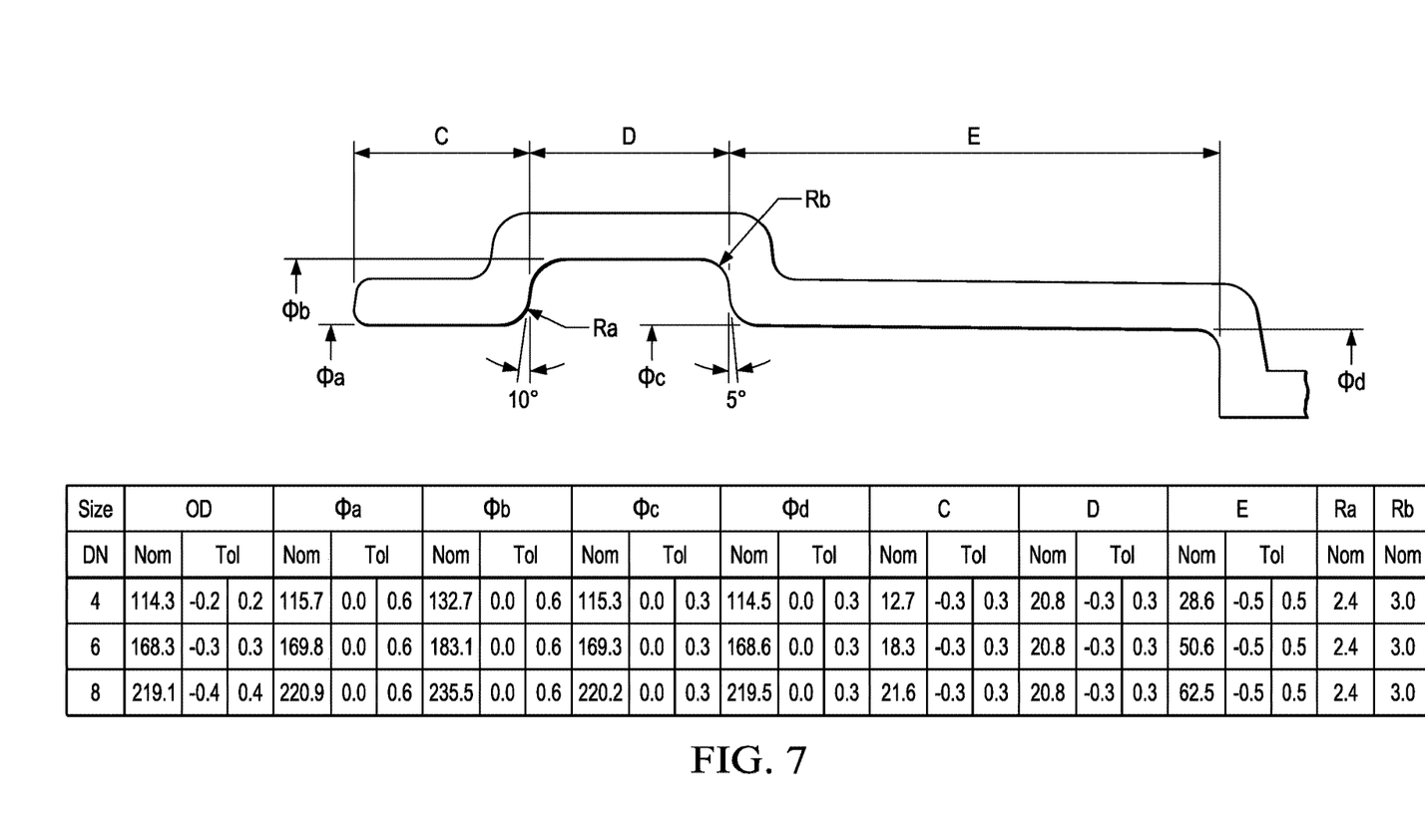
FIG. 7 is an illustration of a section of the socket end of a DWV pipe showing the relative dimensions thereof for various diameter pipes.
Figure 8:
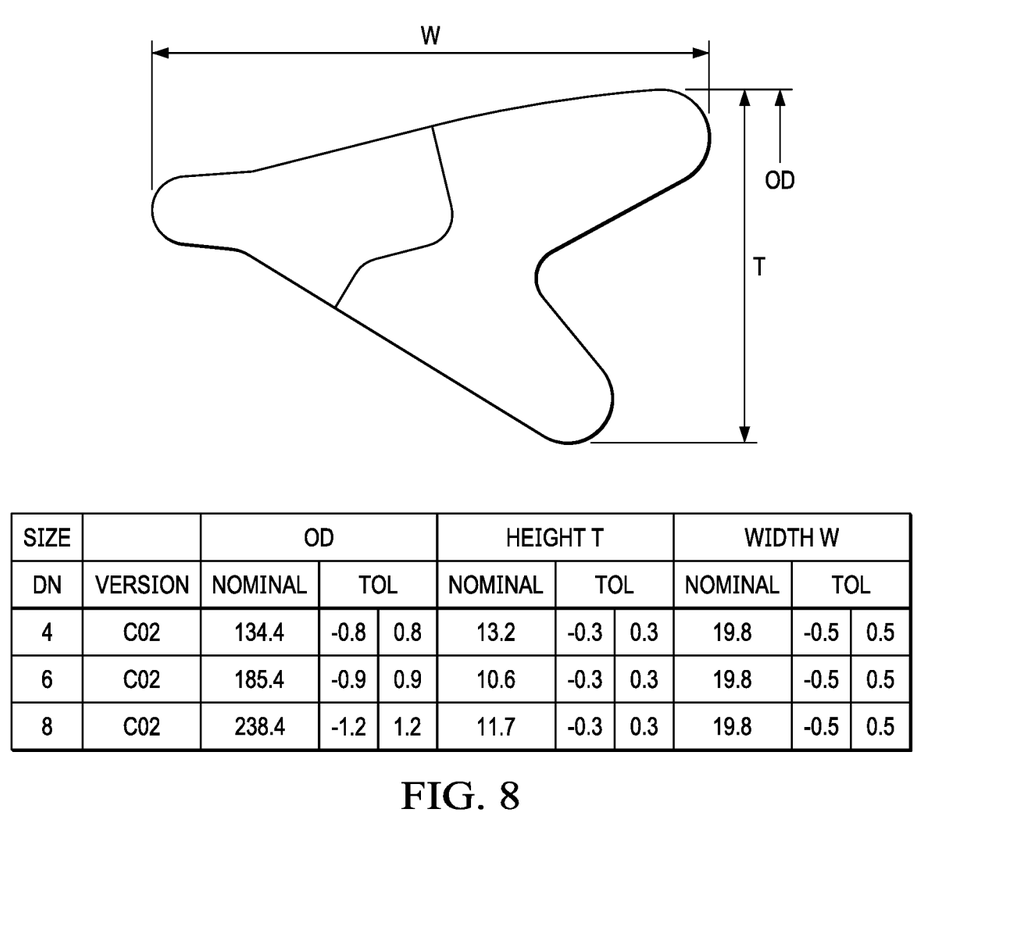
FIG. 8 is a side, cross sectional view of a sealing gasket of the invention, showing the relative dimensions thereof for use in the socket pipe end shown in FIG. 6.

FIG. 7 shows the typical dimensions of a DWV "fitting" with a characteristic rectangular raceway. The depth of the raceway makes for demanding sealing structure requirements. FIG. 8 shows typical dimensions for several sizes of exemplary sealing gaskets of the invention, such as the general gasket form illustrated in FIG. 1A. FIG. 1B is an alternative design with a somewhat more elongated nose region. However, otherwise the dimensions given in FIG. 8 are true for the gasket of FIG. 1B, as well.

The sealing gasket of the invention, designated generally as 25 in FIGS. 3 and 4, is typically used in forming a sealed joint in a DWV pipe "fitting." The fitting could be any typical style DWV fitting, including, for example, elbows, T-style fittings, endcaps, Ys, unions, and the like. Embodiments of the invention are described herein with respect to PVC (polyvinyl chloride) pipe, CPVC (chlorinated polyvinyl chloride) or ABS (acrylonitrile butadiene styrene) pipe as preferred materials for DWV pipe systems, but should not be viewed as being restricted to any particular material or application. PVC, CPVC and ABS are capable of being solvent welded and therefore are amenable for use with the present invention. However, it is to be understood pipe formed from other materials capable of being welded or otherwise bonded together such as by chemical or mechanical means may be acceptable for use in accordance with the present invention. Such pipe systems may include, for example, PP and PE pipe systems.

Figure 1A:
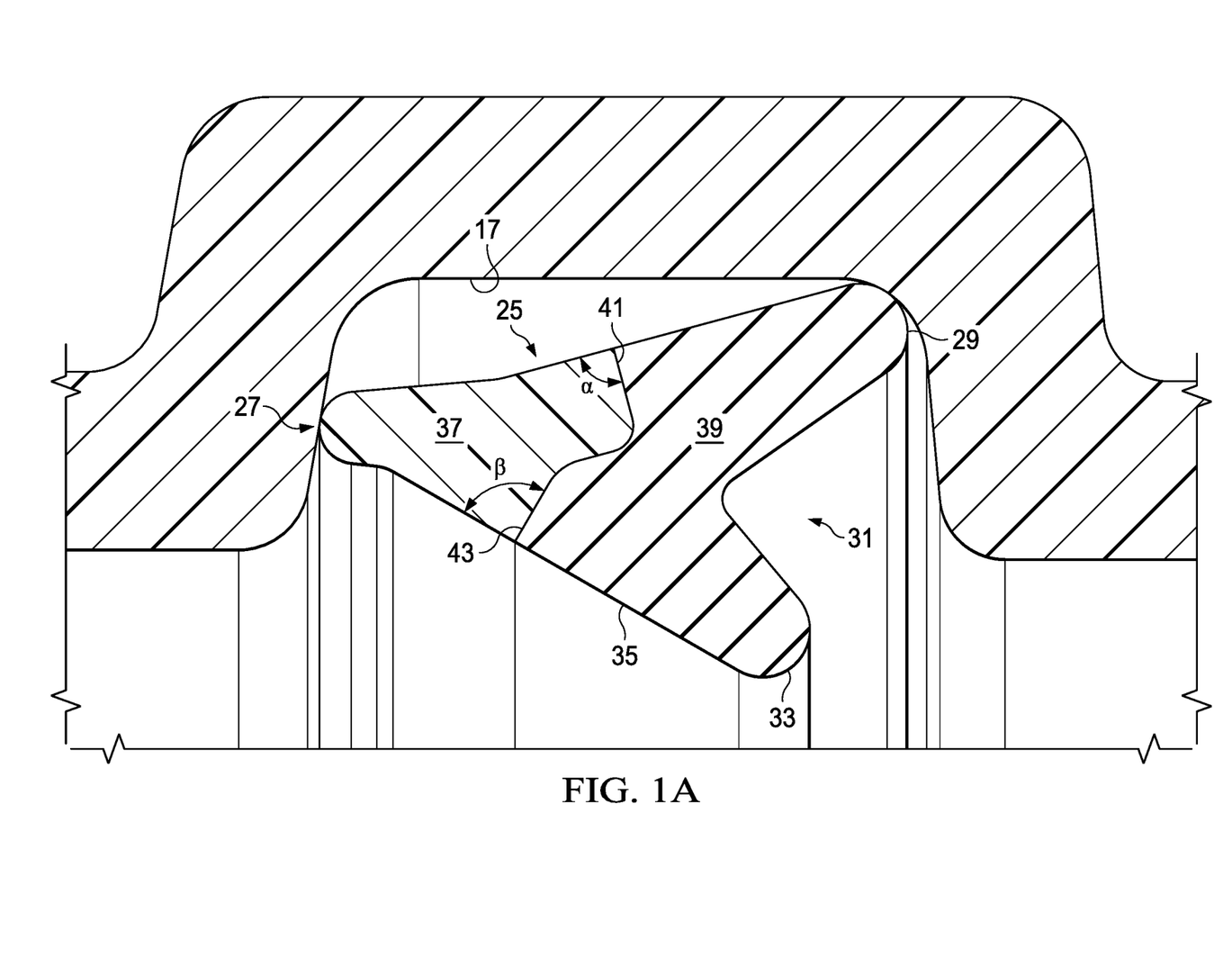
FIG. 1A is a side, cross sectional view of a sealing gasket used in the practice of the invention.
Figure 1B:
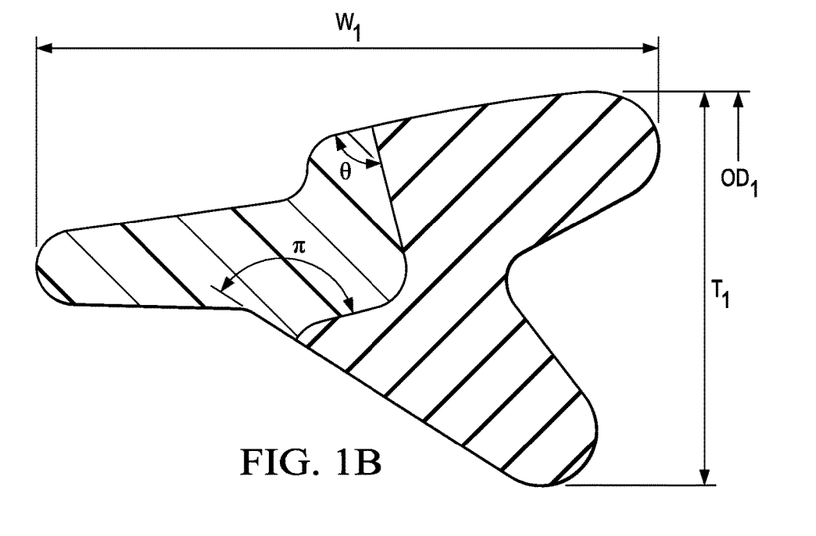
FIG. 1B is a view similar to FIG. 1A, but showing an alternative design for a sealing gasket of the invention having a somewhat elongated nose region.
Figure 2:
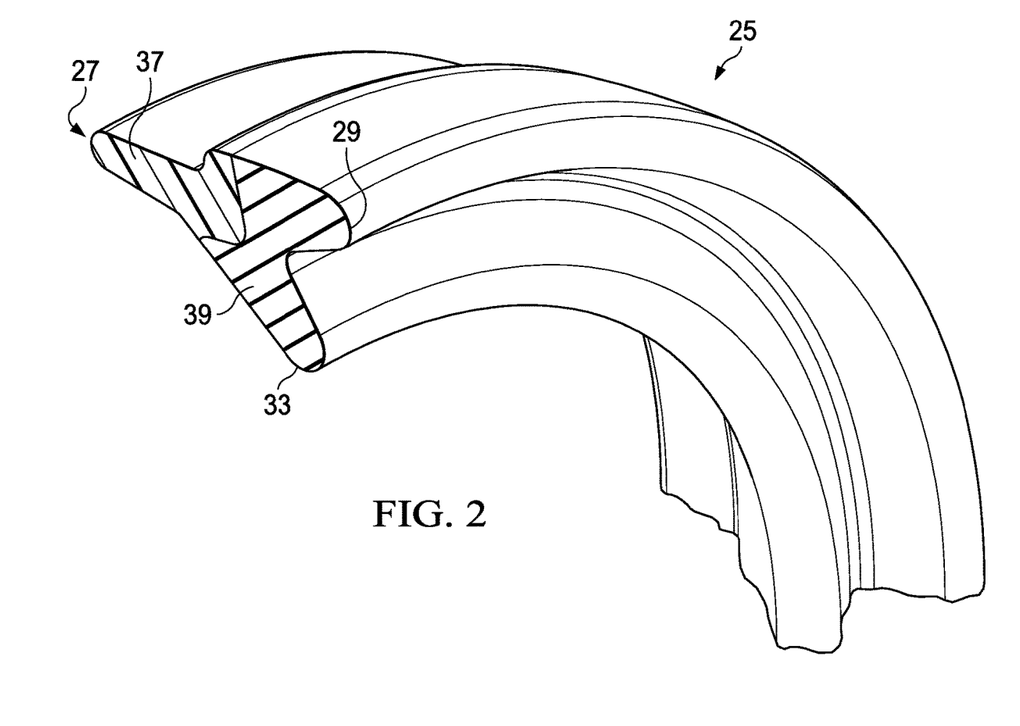
FIG. 2 is a partial perspective view of the sealing gasket of FIG. 1.

Turning now to FIGS. 1A and 2, there is shown a first version of a sealing gasket of the invention 25. As will be appreciated from the drawings, the sealing gasket has a ring shaped composite body which, when viewed in cross section (FIG. 1A), has a leading nose region 27 formed of relatively hard synthetic plastic material, such as polypropylene (PP), and a trailing body region formed of a relatively softer or more flexible rubber or rubber-like "thermoplastic elastomer material" or (TPE). The materials are described more fully below.

As shown in FIG. 1A, the leading nose region 27 is joined to an outwardly extending lip region (generally at 29) which seals against the socket raceway (17 in FIG. 3). The outwardly extending lip region 29 is joined by a V-shaped region 31 to an inwardly extending lip region (generally at 33) which seals against the spigot 19 when the pipe joint is made up (see FIG. 4). The inwardly extending lip region 33 is joined to the leading nose region 27 by a continuous upwardly sloping surface (35 as viewed in FIG. 1) of the gasket 25. The inwardly extending lip region 33 forms a primary compression sealing surface of the gasket. The compression sealing surface forms a compression seal with the exterior surface of the mating spigot pipe end when the mating male spigot pipe end is inserted within the socket pipe end to form a pipe joint. The mating male pipe is typically formed of the same PVC material as the female pipe end and is a plain cylindrical member. The outwardly extending lip region 29 of the gasket similarly constitutes a secondary sealing region of the gasket. As has been briefly explained, the outer circumferential region formed by the lip region 29 of the gasket body contacts the raceway surface (17 in FIG. 3) to form a seal against that surface. The TPE material which forms the trailing section of the gasket body, being more flexible or resilient in nature, facilitates the sealing action of the gasket.

The preferred rubber or rubber-like materials chosen for the relatively softer region of the sealing gasket body are thermoplastic elastomeric materials. The terms "thermoplastic elastomer material" and "synthetic plastic material" or "relatively hard plastic material" are intended to be terms of art, as will be explained in greater detail in the paragraphs which follow. The nature of the materials used in forming the gasket body play a significant role in the functioning of the sealing systems of the invention due to that fact that, unlike gaskets in the pipe sealing industry which are formed totally of a traditional elastomer, such as natural or synthetic rubber, the "composite gasket" of the invention has a leading region of a relatively harder synthetic plastic material (higher durometer) and a trailing region of a relatively softer (lower durometer) thermoplastic elastomer material (TPE).

Turning first to the leading region (37 in FIG. 1A) of the gasket body, the relatively harder synthetic plastic material is preferably a polyolefin, such as polypropylene, polyethylene, polyvinylchloride, etc. A preferred material for the synthetic plastic region of the gasket is polypropylene. The preferred polypropylene material is a high performance impact copolymer showing an appropriate stiffness for the application at hand. The material can be of higher durometer than the remaining portion of the gasket body since it does not participate in the sealing function of the gasket to the same extent as the trailing gasket portion.

Turning now to the material used to form the trailing region (39 in FIG. 1A) of the gasket body, the term "thermoplastic elastomer material" (referred to herein by the shorthand term "TPE") is a relatively newer family of materials known in the industry, as will be explained with reference to the previously used materials. The term "elastomer" as used herein will be intended to mean "any of various polymers having the elastic properties of natural rubber." Similarly, the term "plastic" will be used herein to mean "any of various organic compounds produced by polymerization, capable of being molded, extruded, cast into various shapes and films, or drawn into filaments."

Applicant's use of the term "thermoplastic elastomer material" or TPE is intended to encompass a special type of recently developed "engineered" elastomer. The members of this subset include, for example:

Thermoplastic elastomers (TPE), for example Elastron. ®, etc.

Thermoplastic Vulcanizates (TPV), for example Sarlink, ® Santoprene, ® TPV or Exxon Mobil's Geoplast. ® TPV Thermoplastic Polyurethane (TPU)

Thermoplastic Olefins (TPO)

The preferred thermoplastic elastomer material used for Applicant's trailing region 39 is either a TPE or TPV "vulcanizate" material. These materials are polypropylene based elastomers that exhibit excellent compression set, flex fatigue and low/high temperature performance. They show very good chemical resistance quite appropriate for conveying the fluids found in sewer/waste water systems. Unlike the traditional elastomers used in sealing gasket manufacture, these products can be recycled and reprocessed since the physical and chemical properties of the materials are not degraded. The material can also be thermally bonded to form high strength bonds and in the present application, both the TPV and the PP are perfectly bonded due to their excellent compatibility.

Any of a number of known manufacturing processes can be used to bond the leading and trailing regions of the gasket body. For example, overmolding is an injection molding process where one material (typically TPE) is molded onto a second material (such as a rigid plastic material). If properly seated, the overmolded part will form a strong bond with the plastic part. One advantage of this technique is that the use of primers or adhesives is no longer required to obtain an optimum bond between the materials. One type of overmolding is insert molding where a pre-molded insert is placed in a mold and the TPE is shot directly over it in a one-shot molding operation. Other conventional molding operations can be used in forming the two part bonded gasket of the invention.

Figure 10:
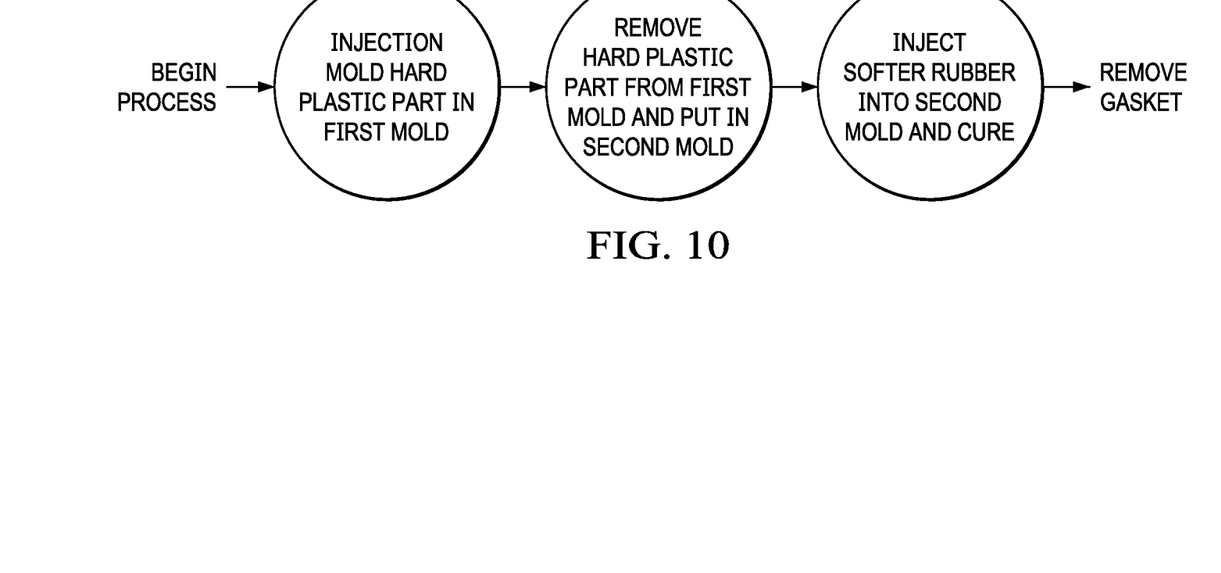
FIG. 10 is a simplified, block diagram of a preferred manufacturing process used to manufacture the sealing gaskets of the invention.

FIG. 10 is a simplified, block diagram of the method steps employed in a particularly preferred manufacturing process of the invention. As illustrated, the process begins by injection molding the hard plastic portion of the gasket in a first mold. The relatively hard plastic portion is then removed in a second step and placed in a second mold. Thereafter, the relatively softer rubber or rubber-like material is injected into the second mold to form the gasket body. The gasket is then cured and thereafter removed from the second mold cavity.

Returning again to FIG. 1A, it will be noted that the PP portion of the gasket 37 is preferably joined to the TPE portion of the gasket 39 by a pair of interface surfaces 41, 43, which form angles "α,β" of approximately 90° with respect to the adjacent exterior surfaces of the gasket. These same angles are illustrated as "θ" and "π" in FIG. 1B. These angles have been found to provide a seal profile with robust and stable definition during and after manufacture. The overall interface locations of the two gasket regions are chosen to provide an optimal compromise of maximum PP volume for cost control and maximum lip flexibility for best performance and minimal strains. It will be appreciated from FIG. 1 that the outwardly extending lip region 29 is of greater relative length than the inwardly extending lip region 33, whereby a space is created between an outer region of the sealing gasket 25 and an edge of the raceway 17 to prevent fishmouthing during joint make up.

Figure 5A:
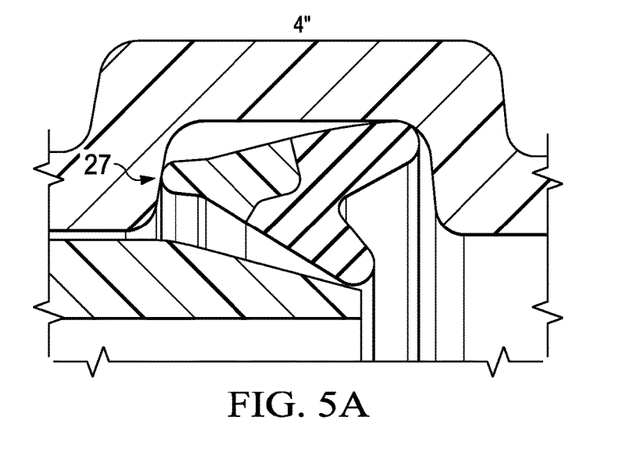
FIGS. 5A-5C show variations of the sealing gasket of FIG. 1 in which the nose region of the gasket is varied in length according to the nature of the raceway in the socket pipe end.
Figure 5B:
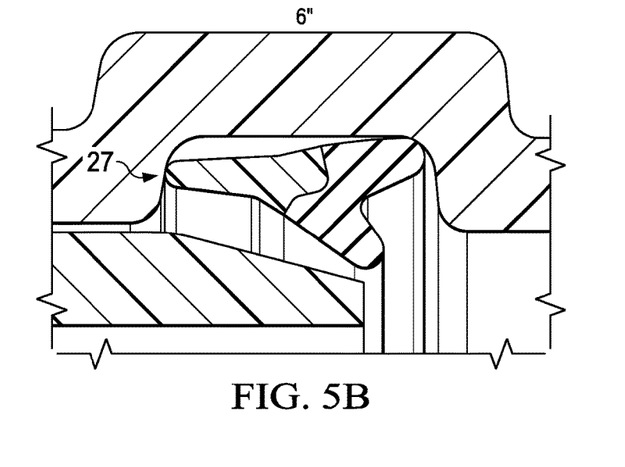
Figure 5C:
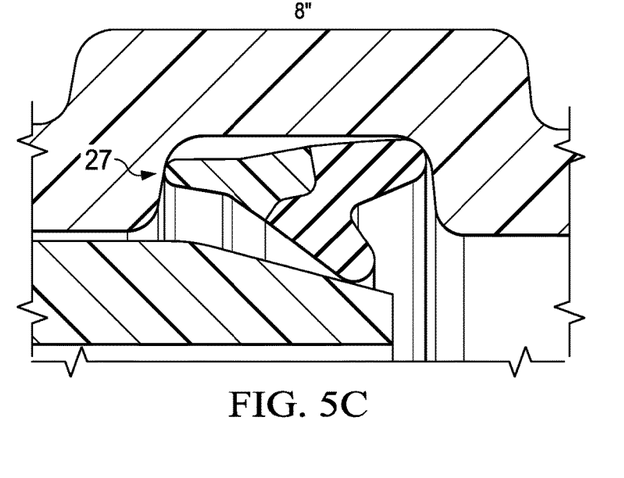

As shown in FIGS. 5A-5C, the length of the nose region 27 of the gasket is made either relatively longer or shorter to adjust to a relatively narrow or wide raceway, depending upon the particular end application at hand. These figures show the gasket fit in raceways with various aspect ratios. FIG. 5A shows a relatively short nose to optimize fit in a relatively deep and narrow raceway. FIG. 5B shows a long nose to optimize fit in a relatively shallow and wide raceway. FIG. 5C shows a medium nose to optimize fit in a moderately shallow and wide raceway. The shape of the TPE section of the gasket remains similar through various sizes and all seals have been found to develop similar strain levels for a designated OD interference. The outwardly extending lip 29 adjusts to the raceway ID while the width at the lip adjusts to the raceway width dimensional variations.

Figure 6A:
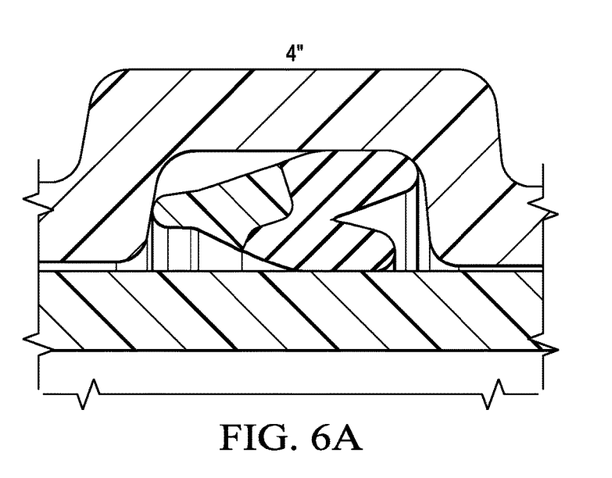
FIGS. 6A-6C are views similar to FIGS. 5A-5C but showing the fit of the sealing gaskets after make-up of the pipe joint.
Figure 6B:
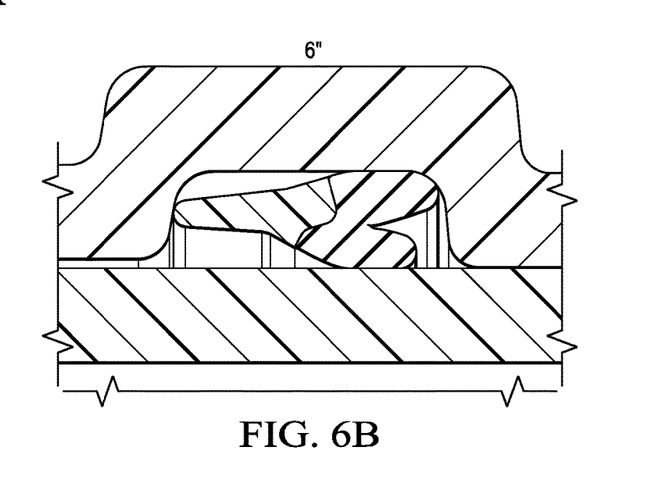
Figure 6C:
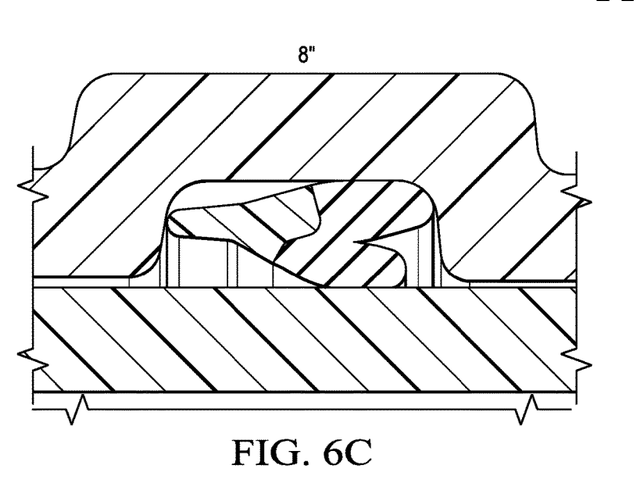

FIGS. 6A-6C are similar to FIGS. 5A-5C, but show the gasket fit after assembly. The optimized nose regions and OD lips ensure lateral gaps remain closed after assembly to prevent ingress of dirt or similar matter that might interfere with sealing. The noses fill or cover regions in the joint that are not required for sealing purposes with relatively strong and low-cost material. These views also illustrate the fact that the long outwardly extending lips 29 on the raceway side create space between the lip on the spigot side and the edge of the raceway (generally at 45 in FIG. 6A) to prevent fishmouthing.

Figure 9:
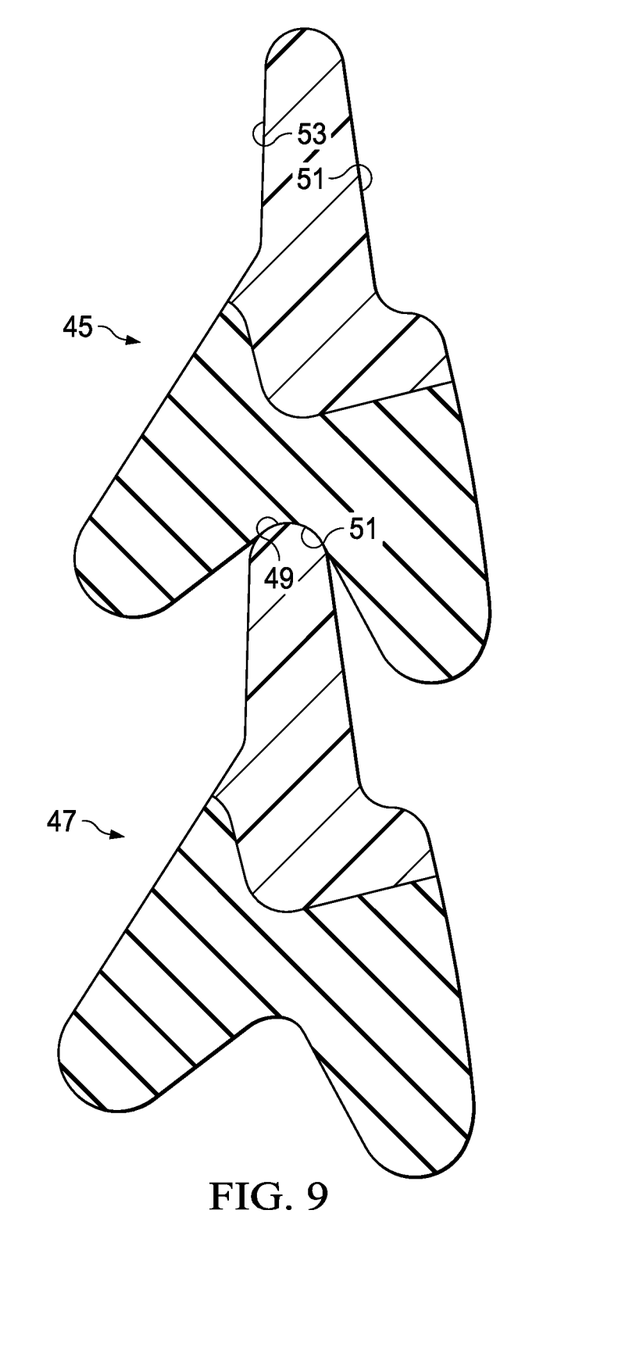
FIG. 9 is a side cross sectional view of a pair of gaskets embodying the principles of the invention, showing two of the gaskets stacked upon one another for shipment.

An invention has been provided with several advantages. The sealing system of the invention provides adequate sealing properties for low pressure applications and is well suited for DWV and sewer pipe applications, in particular. The sealing gaskets of the invention can be used for fittings with rectangular raceways. The sealing system forms a secure joint without requiring the use of glues or adhesives or more complicated mechanical joining systems of the prior art. FIG. 9 shows another advantage which is achieved with the sealing gaskets of the invention. FIG. 9 shows two gaskets of the invention designated as 45 and 47 which have been stacked one upon the other for shipment. The alignment of the nose tip 49 and rear angle of the cavity 51 improves stability of seals when stacked for packaging, handling or automatic installation. Also, with reference to gasket 45, the transition step zone, illustrated at 51 in FIG. 9 improves the effectiveness of vacuum in the plastic cavity and the ability to seal rubber off during the injection step. The low draft angle, illustrated generally at 53 in FIG. 9, helps to retain the plastic insert in the rubber cavity.

While the invention has been shown in several of its forms, it is not thus limited but is susceptible to various changes and modifications without departing from the spirit thereof.

What is claimed is:

1. An assembled low pressure drain waste vent plastic pipe joint, comprising:
   a first section of low pressure drain waste vent plastic pipe having a spigot formed in a first end thereof;
   a second section of low pressure drain waste vent plastic pipe having a socket formed in a first end thereof;
   a sealing gasket for forming a sealed joint between the first and second section of low pressure pipe;
   wherein the spigot of the first section of low pressure pipe is received within the socket of the second section of low pressure pipe and the sealing gasket is disposed there between within a circumferential rectangular raceway formed in an interface of the spigot and socket;
   the circumferential rectangular raceway being formed in the surface of the socket of a first section of DWV pipe, the rectangular raceway having a bottom surface formed between opposing sidewalls, the opposing sidewalls each forming an angle in the range from 5 to 10° with respect to the bottom surface of the raceway;
   wherein the sealing gasket is a composite gasket having a first section which constitutes a relatively hard plastic portion of the gasket bonded to a second section which constitutes a thermoplastic elastomer portion of the gasket, the first section of the gasket being formed of polypropylene and the second section of the gasket being formed of a TPE car TPV material with the two gasket parts being bonded together during manufacture;
   wherein the sealing, gasket is formed with a leading nose region which is joined to an outwardly extending lip region which seals against the socket raceway, the outwardly extending lip region being joined, by a V-shaped region to an inwardly extending lip region which seals against the spigot when the pipe joint is made up, the inwardly extending lip region being joined, to the leading nose region by a continuous sloping surface of the gasket, giving the gasket a generally triangular-shaped cross section;
   wherein the polypropylene portion of the gasket is joined to the TPE/TPV portion of the gasket by a pair of interface surfaces which form angles of approximately 90' with respect to the adjacent exterior surfaces of the gasket; and
   wherein the gasket has a eight to width ratio which is in the range from 0.538 to 0.667; and
   wherein the outwardly extending lip region is of greater relative length than the inwardly extending lip region, whereby a space is created between an outer region of the sealing gasket and an edge of the raceway to prevent fishmouthing during joint make up.

2. The assembled low pressure gasket of claim 1, wherein the nose region of the sealing gasket is made either relatively longer or shorter to adjust to a relatively narrow or wide raceway.

3. A method for forming a sealed joint between first and second sections of drain waste vent plastic pipe without using solvents or glue, the method comprising the steps of:

installing a composite sealing gasket within a rectangular raceway provided in a socket end of a first section of the drain waste vent plastic pipe, the rectangular raceway having a bottom surface formed between opposing sidewalls, the opposing sidewalls each fording an angle in the range from 5 to 10° with respect to the bottom surface of the raceway;

providing a second mating section of drain waste vent plastic pipe having a spigot end;

inserting the mating spigot pipe end into the socket pipe end for a prescribed distance, thereby forming the sealed joint;

wherein the sealing gasket is a composite gasket which is formed having a first section which constitutes a relatively hard plastic portion of the gasket bonded to a second section which constitutes a thermoplastic elastomer portion of the gasket, the first section of the gasket being formed of polypropylene and the second section of the gasket being formed of a TPE or TPV material with the two gasket parts being bonded together during manufacture;

wherein the sealing gasket is formed with a leading nose region which is joined to an outwardly extending lip region which seals against the socket raceway, the outwardly extending hp region being joined by a V-shaped region to an inwardly extending lip region which seals against the spigot when the pipe joint is made up, the inwardly extending lip region being joined to the leading nose region by a continuous sloping surface of the gasket, whereby the gasket has both a distinctive nose tip and a rear angle cavity;

wherein the polypropylene portion of the gasket is joined to the TPE/TPV portion of the gasket by a pair of interface surfaces which form angles of approximately 90' with respect to the adjacent exterior surfaces of the gasket;

wherein the gasket has a height to width ratio which is in the range from 0.538 to 0.667; and wherein the outwardly extending lip region is of greater relative length than the inwardly extending lip region, whereby a space is created between an outer region of the sealing gasket and an edge of the raceway to prevent fishmouthing during joint make up.

4. The method of claim 3, wherein the inserting step comprises the step of;

sliding the first and second sections together until a s within the socket pipe is contacted by the spigot pipe end of the drain waste vent pipe.

5. The method for forming a sealed joint between first and second sections old drain waste vent plastic pipe without using solvents or glue of claim 3, wherein the gasket is one of a shipment of gaskets and wherein the gaskets are aligned for shipment with the nose tips of each respective gasket being aligned with the rear angle cavity of a next adjacent gasket, thereby providing improved stability of the stacked gaskets for packaging and shipment.

* * * * *